Jan. 1, 1952          L. R. WOTTRING          2,580,874
LENS CONTROL MOUNT FOR STEREOSCOPIC PROJECTORS
Filed Aug. 8, 1949          2 SHEETS—SHEET 1
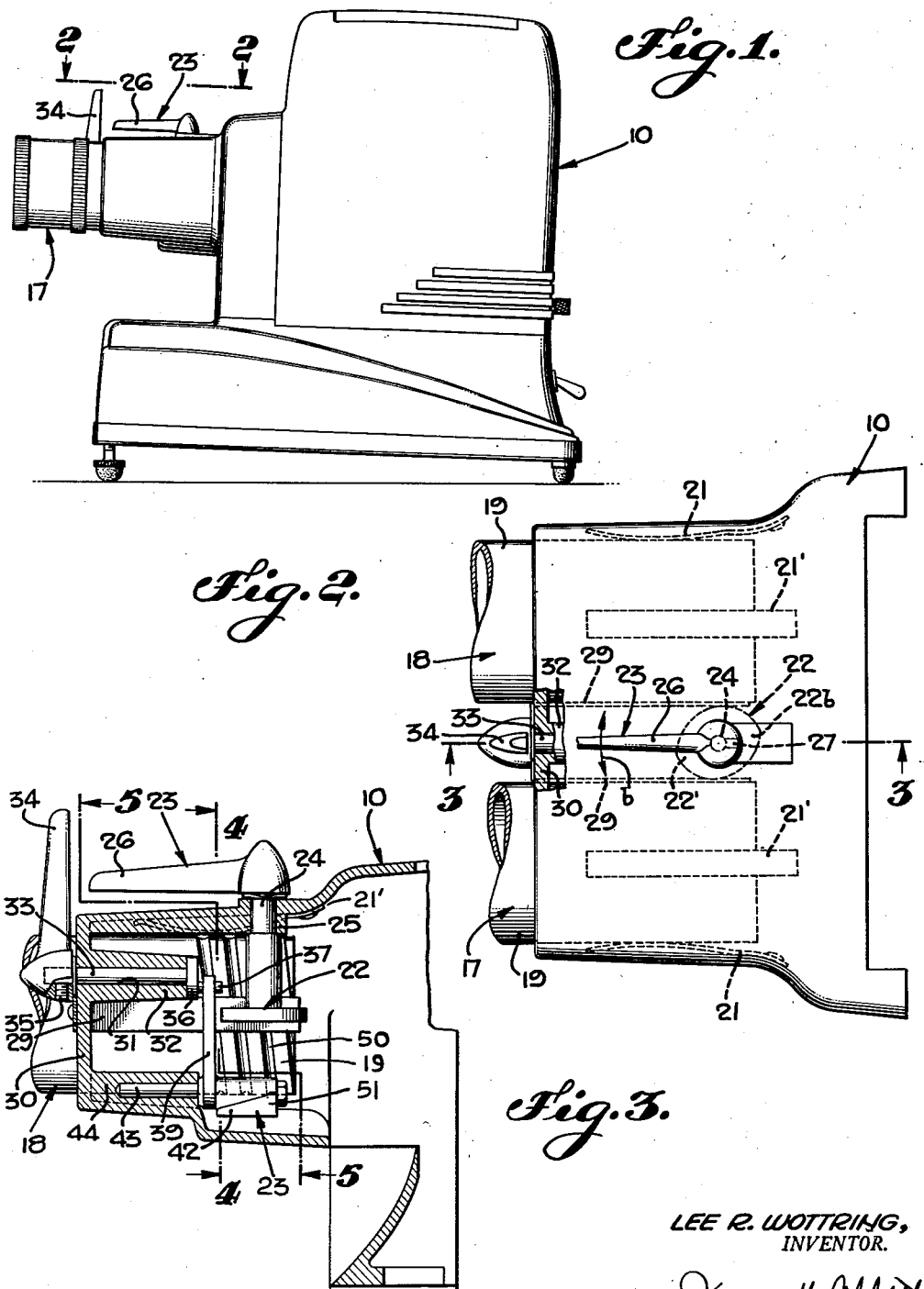
LEE R. WOTTRING,
INVENTOR.
BY James M. Abbett
ATTORNEY Jan. 1, 1952  L. R. WOTTRING  2,580,874
LENS CONTROL MOUNT FOR STEREOSCOPIC PROJECTORS
Filed Aug. 8, 1949  2 SHEETS—SHEET 2

LEE R. WOTTRING,
INVENTOR.

BY

ATTORNEY

Patented Jan. 1, 1952

2,580,874

UNITED STATES PATENT OFFICE 2,580,874

LENS CONTROL MOUNT FOR STEREOSCOPIC PROJECTORS

Lee Roy Wottring, Altadena, Calif.

Application August 8, 1949, Serial No. 109,153

7 Claims. (Cl. 88—24)

This invention relates to the projection of stereoscopic pictures, and particularly pertains to a lens control for stereoscopic projectors.

It is common practice to make two stereographic photographs of the same image and to thereafter prepare transparencies and mount these transparencies in a holder so that they may be simultaneously projected onto a screen. This is usually accomplished by using photographs which are taken in color, and it has been found that any discrepancy in the register of the right- and left-hand views upon the screen will create eye strain and will destroy the third dimension illusion in some cases, which it is the purpose to create in taking the photographs. It is difficult to mount the individual transparencies so that they will be in horizontal and vertical register when projected in superimposed relation to each other upon a screen. It is however possible to adjust the projected image by suitable adjusting mechanism, which has heretofore been done. The structures, however, have been cumbersome and are expensive to manufacture. It is desirable therefore to provide a structure which may easily adjust the projected images in correct superimposition upon the screen, and it is the principal object of the present invention to provide a means for adjusting the projection lines of a stereoscopic projector so that the individual images may be easily placed in register by movement both horizontally and vertically.

The present invention contemplates the provision of a pair of lens tubes through which separate individual light beams may be projected, and which tubes are mounted to float so that they may be moved universally by simple means, and will cause the superimposed images to be projected upon a screen in register.

The invention is illustrated by way of example in the accompanying drawing in which:

Figure 1 is a view in side elevation showing a complete projector with which the present invention is concerned.

Fig. 2 is an enlarged fragmentary view in plan as seen on the line 2—2 of Fig. 1 and shows the relationship of the tubes and part of the adjusting mechanism.

Fig. 3 is a view in vertical section on the line 3—3 of Fig. 2 showing the construction of the adjusting mechanism.

Figure 6:
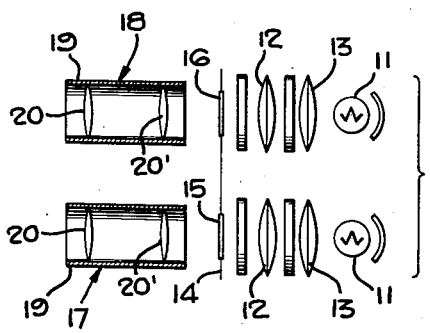
Fig. 6 is a view in diagram showing the optical arrangement of the projector with which the present invention is concerned.

Referring more particularly to Fig. 1 of the drawing, 10 indicates a case or outer housing of a stereoscopic projector. Housed within the structure 10 are sources of light 11 and lens elements 12 and 13, as shown in Fig. 6. If desired a condenser or filter may be interposed between any two of these elements. Disposed in front of the sets of lens elements and the light sources 11 is a film holder 14 which carries transparencies 15 and 16. It is to be understood that these transparencies carry positive images representing right- and left-hand views of the photographic subject. These transparencies may be produced by simultaneous exposures or by consecutive exposures of the identical subject. It is of course understood that the optical axes along which said exposures are taken are horizontally spaced. This spacing may be that represented by the distance between the centers of the pupils of the human eye, or if exaggerated results are to be obtained in the finally projected scene this spacing may be optionally increased. Disposed in front of the film holder 14 are projection lens units 17 and 18. Each of these units includes a lens tube 19 and suitable lenses 20 and 20′. By reference to Fig. 6 it will be seen that the unit 17 is in substantial alignment with the transparency 15 and the light source 11, and that the unit 18 is in substantial alignment with the transparency 16.

Figure 4:
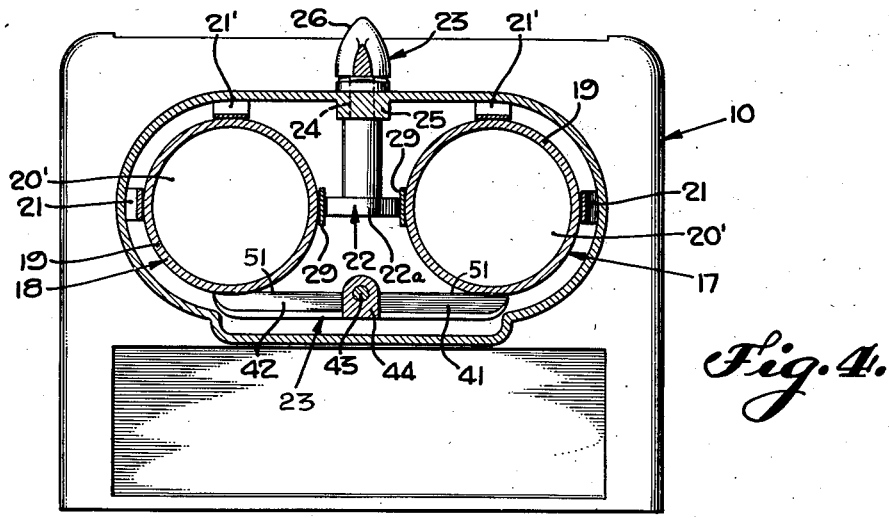
Fig. 4 is a view on the line 4—4 of Fig. 3 and shows the structure by which the light tubes are simultaneously adjusted horizontally.
Figure 5:
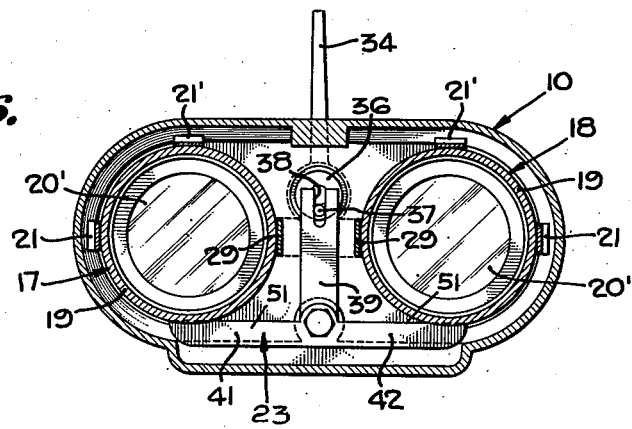
Fig. 5 is a view in vertical section showing the structure indicated in Fig. 3 as seen in the direction of the arrows 5—5.

By reference to Figs. 4 and 5 it will be seen that the projection units 17 and 18 are provided with a floating mounting. The mounting is composed of longitudinally extending leaf springs 21 and 21′. The leaf springs 21 are disposed along the opposite outer sides of the units 17 and 18, and the leaf springs 21′ are disposed above said units and rest thereagainst in a substantially vertical plane. It will thus be seen that projection units 17 and 18 are constantly subjected to pressure in planes at right angles to each other by the leaf springs 21 and 21′.

As shown in Fig. 4 units 17 and 18 are urged outwardly in opposition to the springs 21 by an adjusting cam 22, which will be hereinafter described, and may be urged upwardly by an adjusting lever 23. The cam 22 and the lever 23 are operated by separate operating mechanisms which will be described. The operating mechanism provided for the cam 22 comprises a shaft 24 which extends vertically through a bearing 25 in the upper wall of the housing 10. Secured to the upper end of the shaft 24 is an operating handle 26 which is fastened by a set screw 27, The cam, as shown in Fig. 2 of the drawing, has a portion 22ª at one side of the axis of the cam, and a portion 22ᵇ at the opposite side of the axis of the cam. These portions are in the shape of parabolas and are diametrically disposed. The surfaces of the parabolic portions are connected by intermediate arcuate surfaces concentric with the axis of the cam. The surfaces of the cam bear against the flat surfaces 29 which extend longitudinally of the shells 19 on the contiguous sides of the units 17 and 18. It will be understood that the surfaces 29 are held against the surface of the cam 22 by the yielding action of the springs 21. The operating lever 26 for the cam 22 may swing in either direction, as indicated by the arrow b in Fig. 2, and a desired separation of the images projected onto the screen may be thus brought about in accordance with the degree of rotation of the cam. The setting of the operating lever 26 will not be disturbed by the projection units 17 and 18 being shifted vertically by the structure shown particularly in Fig. 5 of the drawings.

Referring now to Figs. 3 and 5 of the drawings, it will be seen that the housing 10 is formed with a forward wall 30 which is provided with a bearing opening 31. The bearing opening 31 also extends through a boss 32 which is carried upon the back of the wall 30. The opening 31 through the wall and the boss receives a crankshaft 33. The crankshaft 33 carries an operating lever 34 at its forward end. This lever is secured in position by a set screw 35. At the rear end of the shaft a crank disc 36 is provided and is preferably formed integral with the shaft 33. A crank pin 37 projects from the vertical face of the disc and has its axis parallel to the crankshaft 33. The pin 37 is disposed eccentrically with relation to the shaft 33 and fits within a slot 38 of a vertically extending lever arm 39. The lever arm 39 is formed integral with lifting lever 23 which has arms 41 and 42 extending oppositely from the vertical center of the arm 39. The lever arm 39 and the lever 23 are pivoted upon a pin 43. This pin is secured within a boss 44 formed in the housing 10. The lever arm 39 and the lever 23 are disposed so that the lever 23 will be beneath the rear ends of the projection units 17 and 18, and the forward ends of said unit will be supported in the housing. Due to this arrangement lifting or lowering of the inner ends of said units will tilt these and adjust their optical axes in substantially parallel vertical planes.

As clearly shown in Fig. 3, rear end portions of the tubes 19 are provided externally with helical grooves 50. Thus, when one of the projection lens units 17 or 18 is rotated about its own axis until a portion of the helical groove 50 thereof comes opposite one of the arms 41 and 42 of the lever 23, the wedge shaped upper edge 51 formed on these arms enters the groove 50 of said unit so that further rotation of this unit adjusts the latter longitudinally through the opening in the wall 30 in which it is mounted. It is thus seen that the grooves 50 provide what is in effect a threaded relationship between the tubes 19 and the lever 23 whereby longitudinal adjustment of either of the projection lens units 17 and 18 may be accomplished by rotating this unit about its own axis.

In operation of the present invention the stereoscopic projector is assembled as shown in the drawings, and the holder 14 is equipped with suitable transparencies 15 and 16. As has been previously explained, the transparencies represent right- and left-hand views of a photographic image and when projected upon a screen are intended to produce the illusion of depth or third dimension. When a suitable electric circuit is established through the illuminating means 11 the photographic image of each of the transparencies will be projected simultaneously upon a screen. It is understood that the transparencies may be in black and white or in color. When the two images are projected upon the screen it may be found that the transparencies in the holder are neither in vertical alignment nor in horizontal alignment. It is therefore necessary to shift the optical axes of the projection units in order to bring proper registration of the right- and left-hand images. In the event that the images are not in horizontal register the control lever 26 may be rotated appropriately, as indicated by the arrow b in Fig. 2. This operation will swing the rear ends of the projection units 17 and 18 toward each other or away from each other as required, it being understood that the forward ends of said units are supported to permit the necessary degree of universal free swinging movement of said units in the end wall 30 of the housing for the rear ends of said units to be adjustable as described.

The operation of the vertical adjusting means may be understood by referring to Figs. 3 and 5. Here it will be seen that swinging movement of the adjusting lever 34 will cause the crankshaft 33 to rotate and this will cause the pin 37 to be oscillated in the slot 38 at the end of the lever arm 39. Since the lever arm 39 and the lever 23 are united, they are thus rocked upon the pivot 43, thereby causing the lever arms 41 and 42 to move simultaneously in opposite directions vertically, with the result that the rear ends of units 17 and 18 will move correspondingly. As will be understood the longitudinally extending springs 21 always exert a downward yielding pressure against the units 17 and 18. This urges said units against the outer ends of the lever 23 and will restore said units to their original positions when the lever 23 is returned to its normal horizontal position.

It will thus be seen that by manipulation of the adjusting levers 26 and 30 the optical axes of the light tubes may be simultaneously adjusted universally and throughout an area of projection on the screen which will cause the projected images to be accurately superimposed and the illusion of third dimension correctly produced.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In a stereoscopic projector, the combination of: a housing, including a front wall having formed therein a pair of openings spaced horizontally, a pair of lens tubes having projection lenses, said tubes being mounted in said openings and extending forwardly therefrom, a source of light within said housing from which beams of light may travel along paths which extend through said lens tubes, lens sets within said housing and interposed in said paths between said source of light and the inner ends of said lens tubes, means for supporting stereoscopic transparencies in said paths between said light source and said lens tubes, said transparencies representing right-hand and left-hand views of a photographic subject, said openings providing a floating mounting for each of said lens tubes whereby the directions of their optical axes may be adjusted, and means for adjusting said lens tubes so that the projected images will be placed in register upon a screen.

2. In a stereoscopic projector, the combination of: a housing formed to include a main housing structure enclosing a light source and a forward extension from said structure having a front wall, there being horizontally spaced openings in said front wall of said extension, means within said housing for supporting a pair of stereoscopic transparencies, optical lens sets disposed between said light source and said transparencies, a pair of lens tubes having projection lenses mounted therein said tubes being mounted within said extension of said housing and extending through said openings in said front wall of said extension and being free for universal oscillation within said openings, adjustable mechanical means between said lens tubes for spreading the inner ends of said lens tubes with relation to each other, yieldable means acting to hold the inner ends of said lens tubes against said spreading means, adjustable mechanical means for raising and lowering the rear ends of said tubes, and yieldable means holding said lens tubes against said raising and lowering means, the latter means acting to simultaneously adjust the inner ends of said tubes vertically in opposite directions.

3. In a stereoscopic projector, the combination of: a housing having a forward wall in which a pair of horizontally spaced openings are formed, a light source enclosed in said housing, from which beams of light travel along approximately parallel paths through said openings, complementary lens sets enclosed within said housing in said paths, a pair of lens tubes having projection lenses mounted therein, said tubes being mounted respectively in said openings for longitudinal movement and for universal oscillatory movement about the centers of said openings, means for supporting a pair of stereoscopic transparencies in said paths between said lens tubes and said complementary lens sets, a cam mounted on said housing and interposed between said lens tubes and acting, upon rotation, to move said tubes away from each other, means upon the opposite sides of said lens tubes for yieldably holding the latter against said cam, a supporting member mounted on said housing and extending beneath inner ends of said lens tubes, and being movable to lift the same, means yieldably bearing downwardly upon said lens tubes in opposition to said lifting action, and means for adjustably positioning said lifting means.

4. In a stereoscopic projector, the combination of: a housing having a forward wall in which a pair of horizontally spaced openings are formed, a light source enclosed in said housing, from which beams of light travel along approximately parallel paths through said openings, complementary lens sets enclosed within said housing in said paths, a pair of lens tubes having projection lenses mounted therein, said tubes being mounted respectively in said openings for longitudinal movement and for universal oscillatory movement about the centers of said openings, means for supporting a pair of stereoscopic transparencies in said paths between said lens tubes and said complementary lens sets, a cam mounted on said housing and interposed between said lens tubes and acting, upon rotation, to move said tubes away from each other, means upon the opposite sides of said lens tubes for yieldably holding the latter against said cam, a supporting member horizontally pivoted intermediate its ends on said housing, end portions of said member extending beneath inner ends of said lens tubes whereby the latter rest upon said member, a lever on said member for swinging said member to cause one tube to be lifted while the other tube is correspondingly lowered, yieldable means urging said lens tubes downwardly against said supporting member, and means for swinging said lever and said tube supporting member.

5. A stereoscopic projector, including dual sources of light, complementary lens sets for transmitting light received from said sources in the form of approximately parallel light beams, means for locating dual stereoscopic transparencies in the paths of said beams, dual projection lenses for projecting said beams as modified by passing through said transparencies, dual lens tubes in which said projection lenses are mounted, means providing universally oscillatory mountings for said lens tubes about corresponding points in the optical axes thereof, and means for selectively and controllably oscillating said lens tubes in opposite directions about said points, horizontally and vertically.

6. A combination as in claim 5 in which said lens tubes have cylindrical form and are provided externally with helical grooves which are engaged by said oscillating means whereby rotation of either of said lens tubes about its own axis effects a controlled longitudinal movement of said lens tubes, thus rotated, through its floating mounting aforesaid.

7. In combination, a wall provided with an opening, a cylindrical lens tube extending through said opening with sufficient freedom to allow a degree of longitudinal and rotative movement of said unit in said opening and a degree of swinging movement about the center of said opening, said unit having a helical groove in the outer surface of a portion thereof, projection lenses mounted in said lens tube, means for engaging said tube in said groove for controllably swinging said tube about said center of said opening, and yieldable means engaging said tube and pressing it against said swinging means to maintain the latter in said groove, the engagement of said tube swinging means with said tube in said groove transmitting longitudinal movement to said tube when the latter is rotated in said opening.

LEE ROY WOTTRING.

REFERENCES CITED

The following references are of record in the file of this patent:

UNITED STATES PATENTS

| Number | Name | Date |
|---|---|---|
| 625,627 | Woody | May 23, 1899 |
| 1,861,496 | Guggenheim | June 7, 1932 |
| 1,962,501 | Gilmore | June 12, 1934 |
| 1,985,470 | Thomas | Dec. 25, 1934 |
| 2,109,596 | Plahn | Mar. 1, 1938 |
| 2,285,470 | Stando et al. | June 9, 1942 |
| 2,384,319 | Lebus | Sept. 4, 1945 |